No. 616,920. Patented Jan. 3, 1899.
J. N. HALIFAX.
MACHINE FOR MAKING JOINTS FOR TUBULAR ARTICLES.
(Application filed Dec. 27, 1897.)
(No Model.) 7 Sheets—Sheet 1.
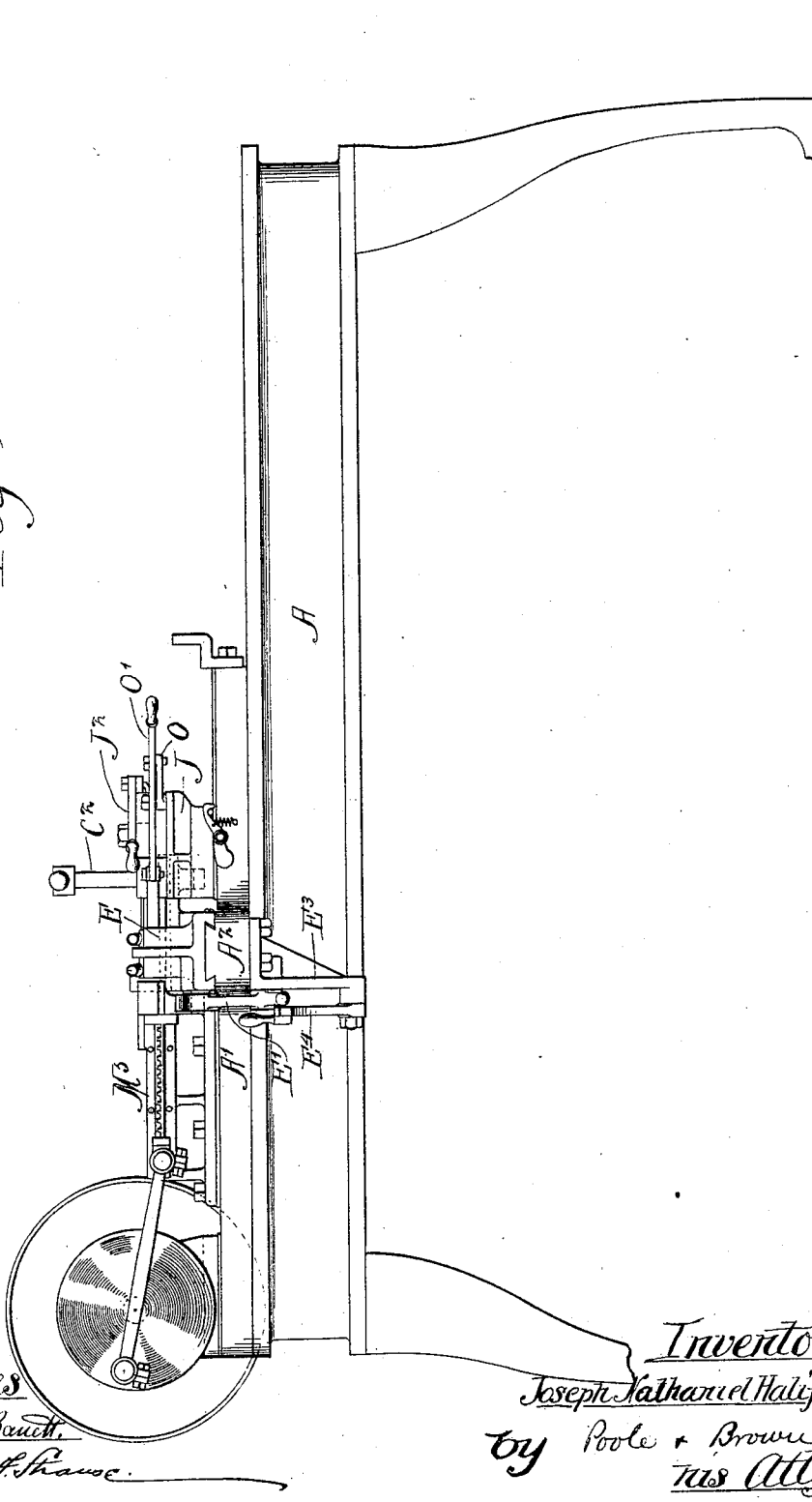

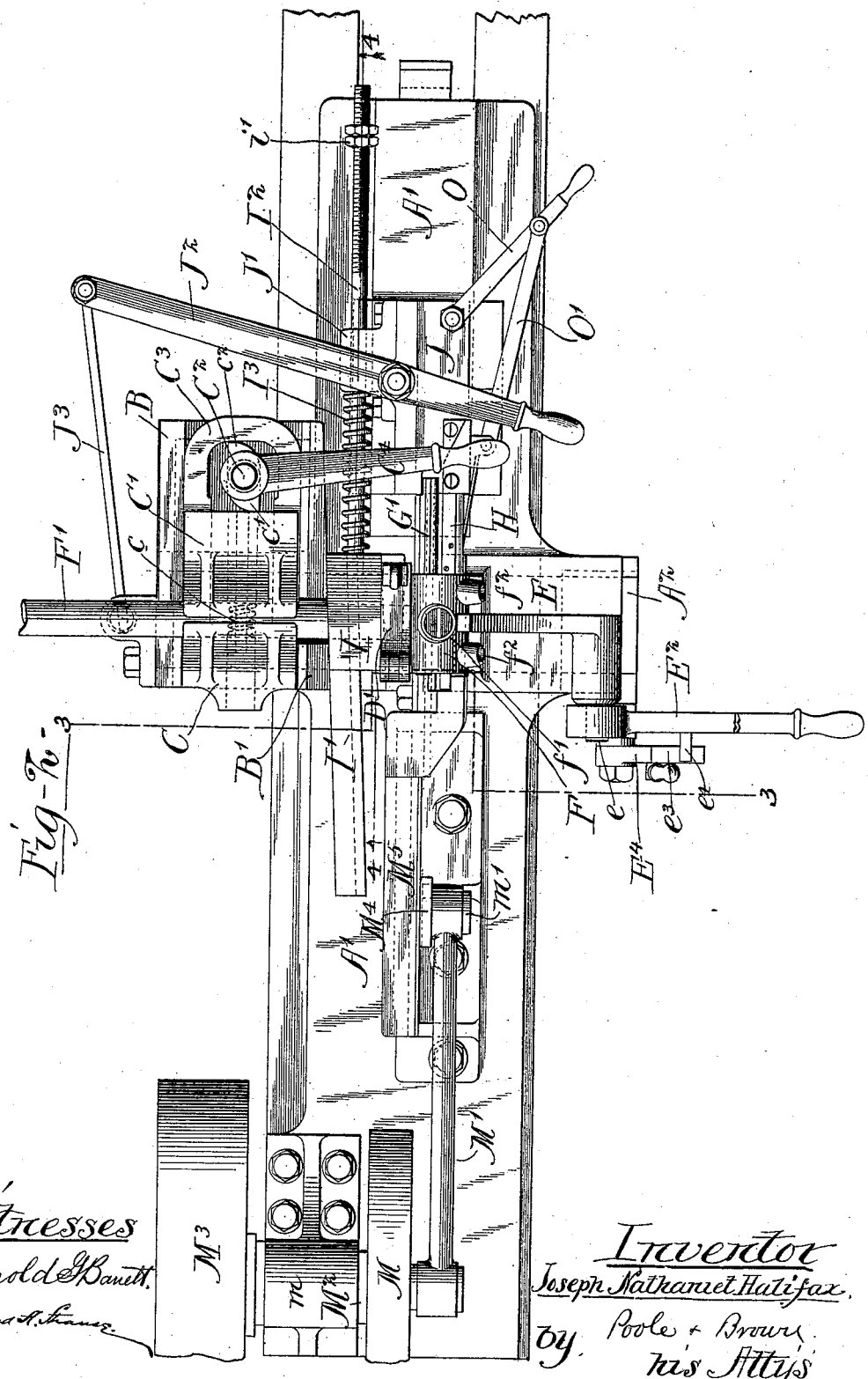

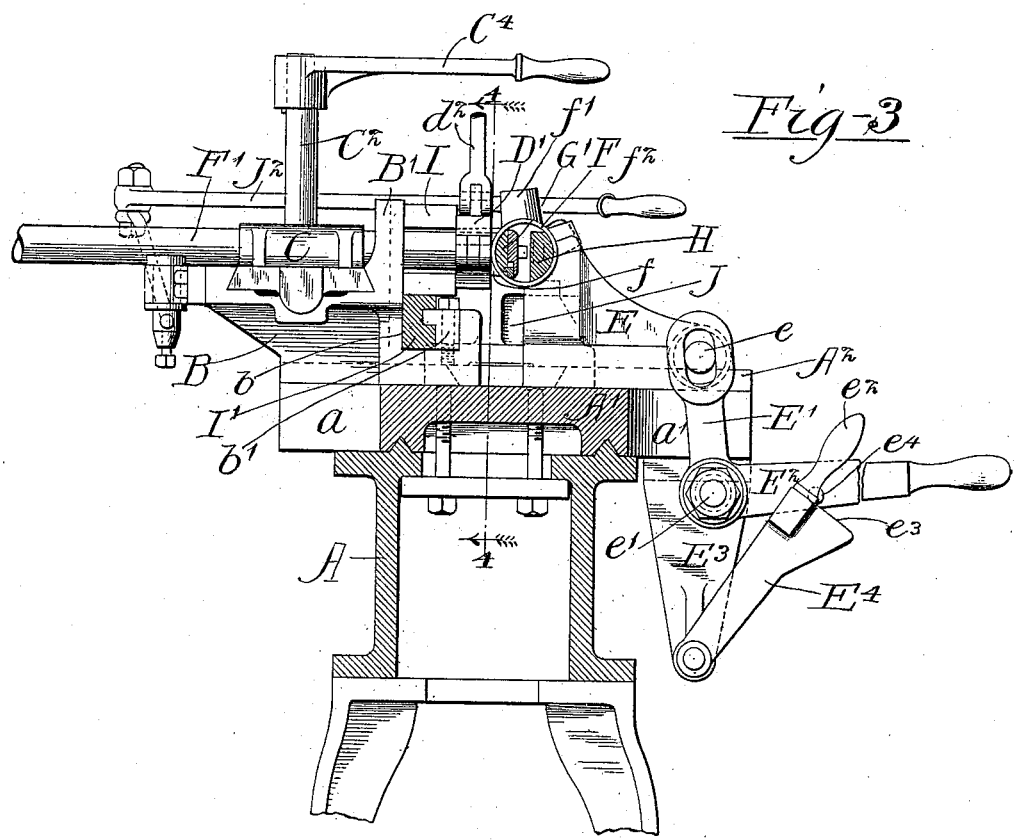
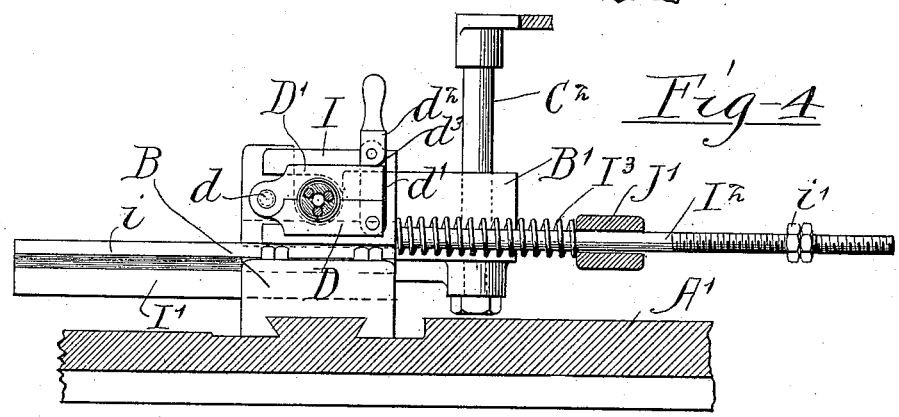

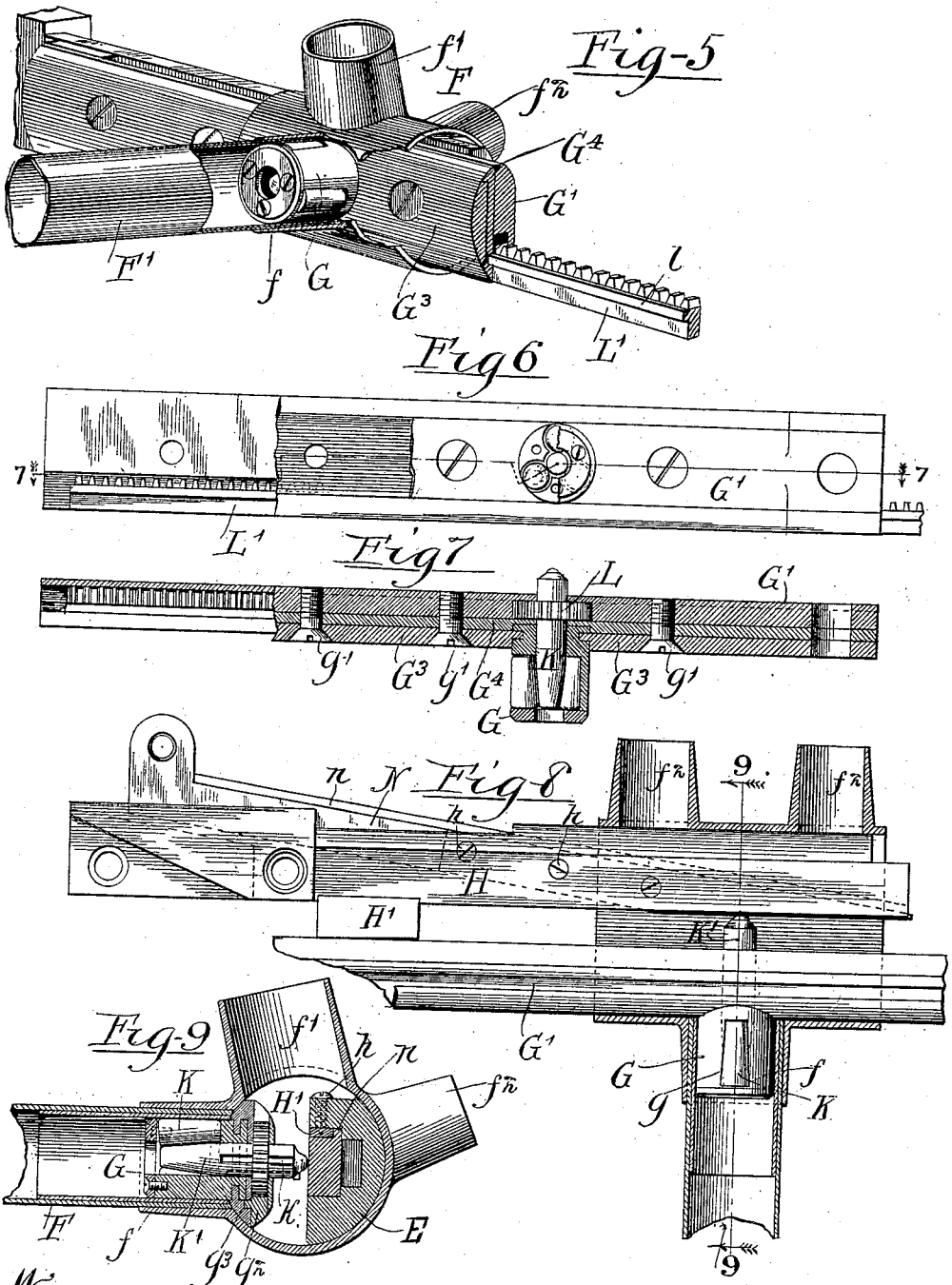

No. 616,920. Patented Jan. 3, 1899.
J. N. HALIFAX.
MACHINE FOR MAKING JOINTS FOR TUBULAR ARTICLES.
(Application filed Dec. 27, 1897.)
(No Model.) 7 Sheets—Sheet 5.
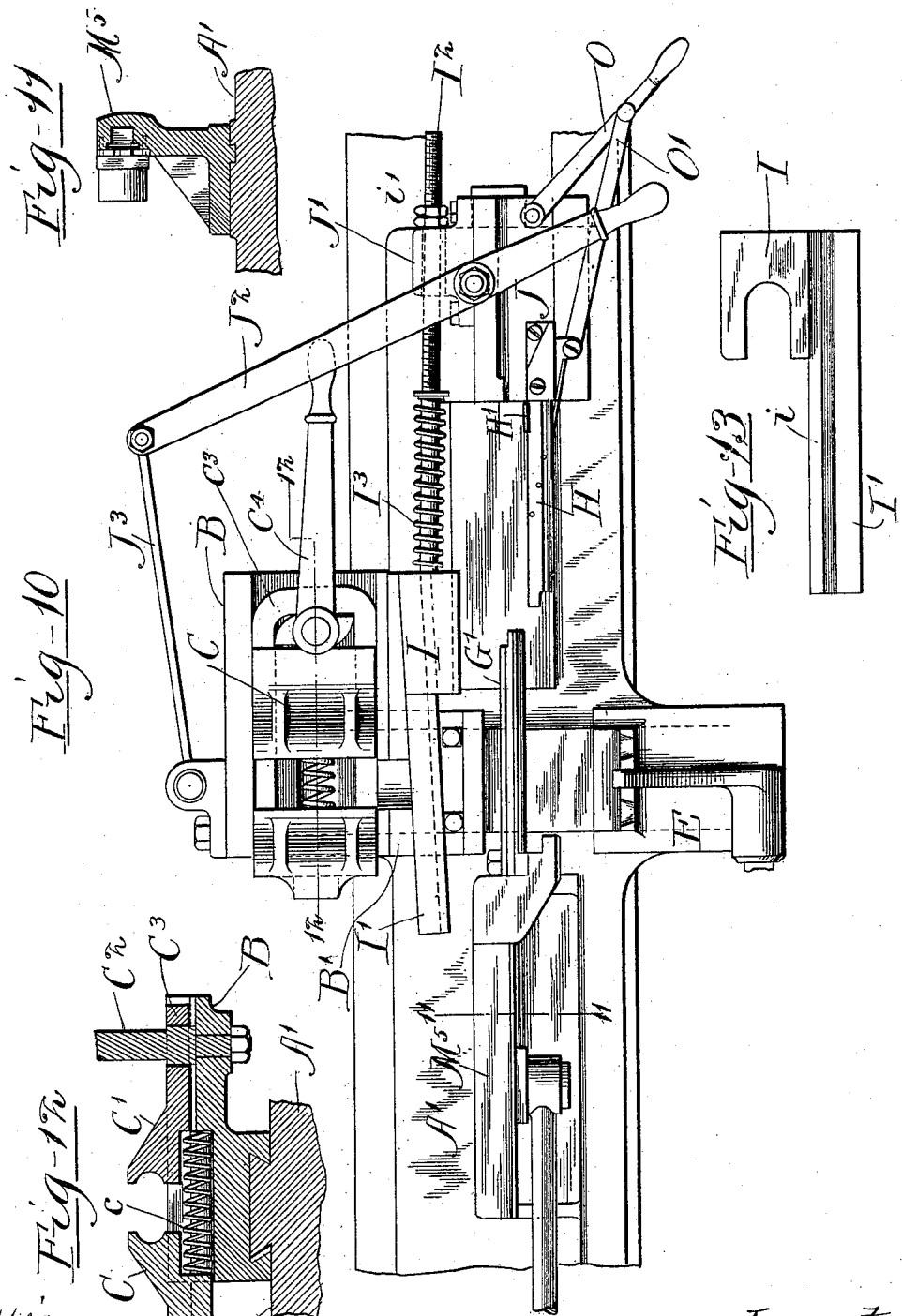
Witnesses
Inventor
Joseph Nathaniel Halifax
by Poole & Brown
his Attys.

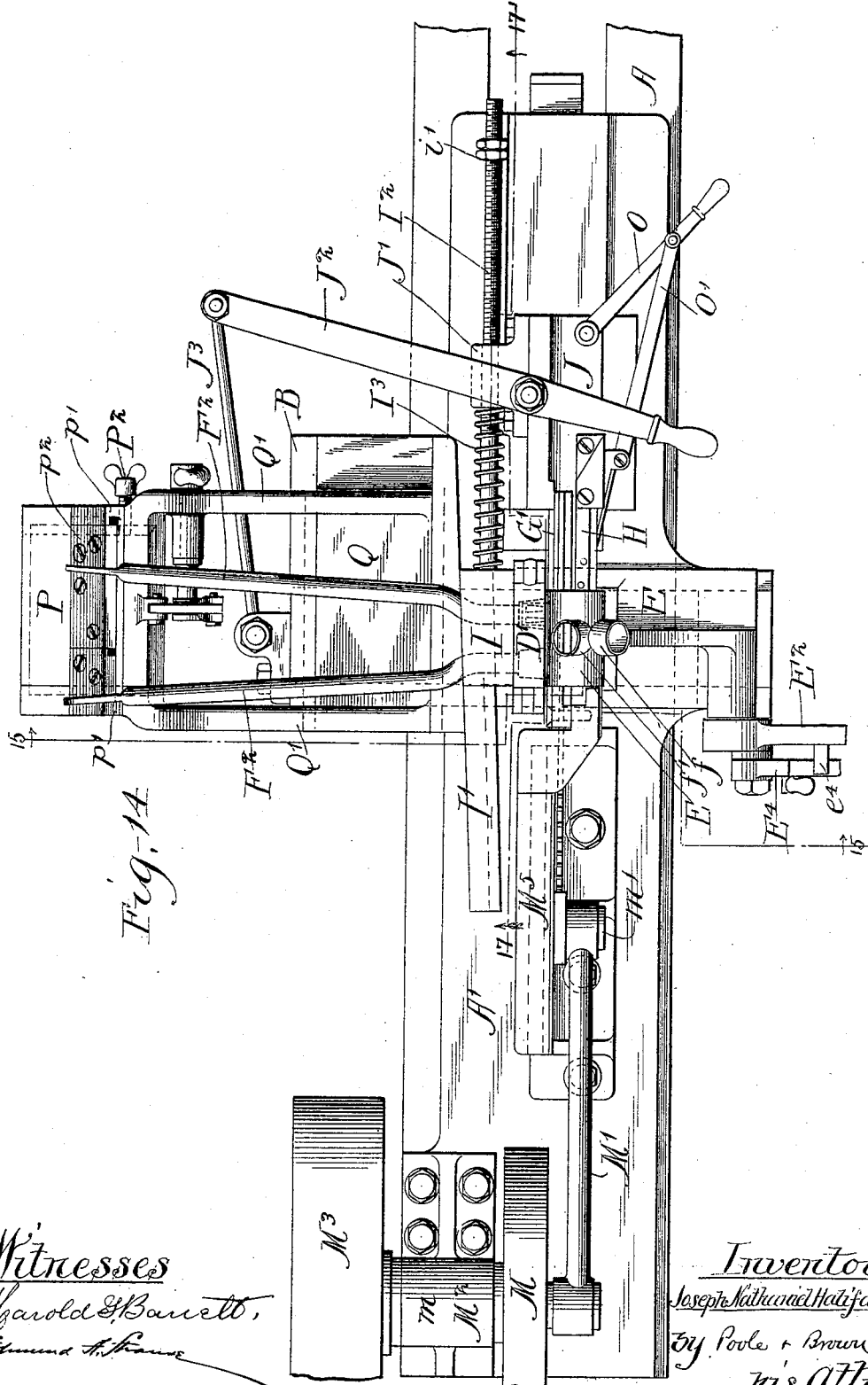

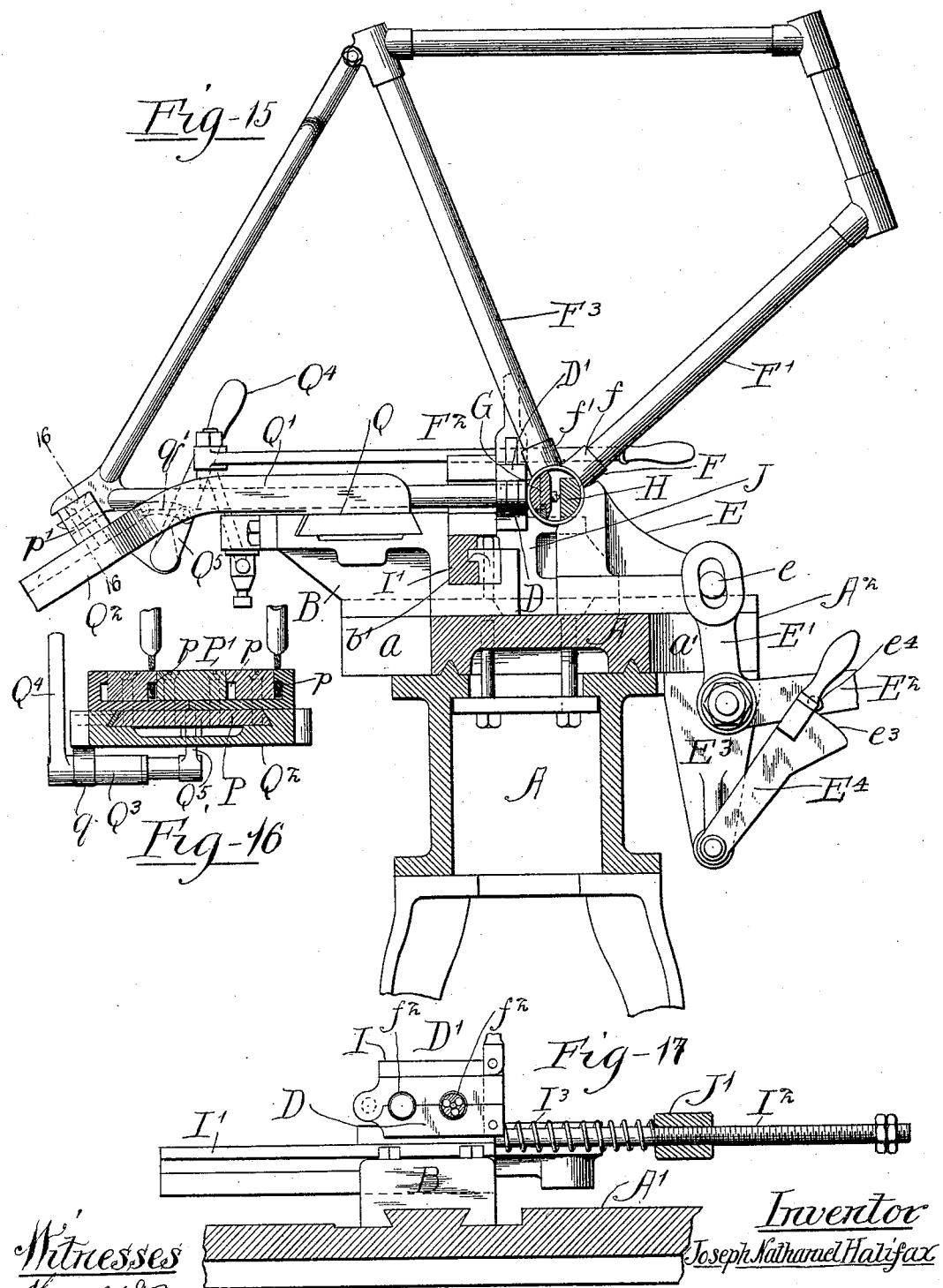

UNITED STATES PATENT OFFICE.

JOSEPH NATHANIEL HALIFAX, OF CHICAGO, ILLINOIS, ASSIGNOR TO THE GEO. L. THOMPSON MANUFACTURING COMPANY, OF SAME PLACE.

MACHINE FOR MAKING JOINTS FOR TUBULAR ARTICLES.

SPECIFICATION forming part of Letters Patent No. 616,920, dated January 3, 1899.

Application filed December 27, 1897. Serial No. 663,516. (No model.)

*To all whom it may concern:*

Be it known that I, JOSEPH NATHANIEL HALIFAX, of Chicago, in the county of Cook and State of Illinois, have invented certain new and useful Improvements in Machines for Making Joints for Tubular Articles; and I do hereby declare that the following is a full, clear, and exact description thereof, reference being had to the accompanying drawings, and to the letters of reference marked thereon, which form a part of this specification.

This invention relates to machines intended for the purpose of making joints in tubular articles, such as the frames of bicycles, of that kind consisting of an external tubular part or socket and an inner tubular part, the end of which is inserted within the outer part or socket and distended into close contact with the inner surface of the same, the inner surface of the socket being roughened by knurling or like process, so as to form interlocking recesses and projections in the interfitting parts after the inner part has been distended or expanded within the outer one. Joints of this kind are shown in a prior patent, No. 547,400, granted October 1, 1895, to Samuel Palmiter, and also in an application for Letters Patent, Serial No. 656,875, filed by me October 30, 1897.

The invention relates more specifically to a machine employed for distending or expanding the inner tubular part into contact with the socket in cases where the socket constitutes a lateral branch or integral thimble upon a tubular fitting, such as is employed to join the frame members of a bicycle or for like uses.

The invention consists in the matters hereinafter described, and pointed out in the appended claims.

A machine embodying my invention embraces as its main or principal features clamping devices for holding rigidly in proper relative position the tubular parts to be joined, an expanding-mandrel adapted to enter the inner tubular part, and means for supporting and actuating said expanding-mandrel, embracing a supporting-mandrel which is adapted to extend through the transverse part of the crank-hanger or other tubular fitting to which the frame member is to be secured and from which the expanding-mandrel laterally projects. The expanding-mandrel, together with the means for supporting and actuating the same, constitute in themselves an important part of my invention, the same embracing, in connection with an expanding-mandrel which is mounted on a longitudinal supporting-mandrel, of means mounted on the longitudinal supporting-mandrel by which rotary motion is given to the mandrel and the same is expanded during its rotary movement.

The invention may be more readily understood by reference to the accompanying drawings, in which—

Figure 1 is a view in side elevation of a machine embodying the several features of the invention. Fig. 2 is a plan view, on an enlarged scale, of the main working parts of said machine. Fig. 3 is a cross-section taken on line 3 3 of Fig. 2. Fig. 4 is a longitudinal detail section taken on line 4 4 of Fig. 3. Fig. 5 is a view in perspective of the expanding-mandrel and parts immediately supporting and actuating the same. Fig. 6 is a view in side elevation of the parts shown in Fig. 5. Fig. 7 is a plan section taken on line 7 7 of Fig. 6. Fig. 8 is a plan view of the parts shown in Fig. 5. Fig. 9 is a detail cross-section taken on line 9 9 of Fig. 8. Fig. 10 is a detail plan view of the parts for holding the fitting and frame-tube in position with respect to the expanding-mandrel. Fig. 11 is a detail section on line 11 11 of Fig. 10. Fig. 12 is a detail section on line 12 12 of Fig. 10. Fig. 13 is a detail side view of the wedge-block and its supporting-bar. Fig. 14 is a plan view of a machine slightly differing from that shown in the preceding figures. Fig. 15 is a vertical transverse section thereof, taken on line 15 15 of Fig. 14. Fig. 16 is a detail cross-section taken on line 16 16 of Fig. 15. Fig. 17 is a detail longitudinal section taken on line 17 17 of Fig. 14.

As illustrated in said figures, A indicates the frame or bed of the machine, which is supported on suitable legs and upon which rests a horizontal bed-plate A', carrying the operative parts of the machine. Upon the top of said plate A' is formed a transverse guide-rib A², shown as made of dovetailed shape, the plate being provided with lateral extensions a a', Fig. 3, over which the rib extends, so that the rib is made considerably greater in length than the width of the main part of the plate. Rigidly secured to said plate by means of the said rib and a set screw or screws, which adjustably hold it in place, is a block or casting B, which carries clamping devices, embracing a pair of clamping-jaws C C', by which the tubular frame member is clamped or held in place with respect to the socket of the hanger or fitting. A second pair of clamping-jaws D D' are adapted to have clamping engagement with the socket, within which the frame member is inserted and expanded for the purpose of holding said socket from expansion during the operation of distending the end of the frame member within the same. Said jaws D D' are shown as unattached to other parts of the machine, although they coact with such other parts in the operation of the machine. Also mounted on the guide-rib A² is a sliding clamping-jaw E, which acts upon the fitting at its side opposite said socket to confine the said fitting closely in position with respect to the frame member.

In the drawings I have shown a fitting F, which constitutes the crank-hanger tube of a bicycle and is provided with integral tubular thimbles or sockets $f\,f'\,f^2\,f^2$, Figs. 5, 8, and 9, of which the socket $f$ is the one in which the frame member (indicated by F' in the drawings) is intended to be secured by the use of the machine described.

When the parts are in position to be joined, longitudinal supporting-mandrels G' and H extend through the fitting F, said mandrel G' serving to support the expanding-mandrel and the mandrel H supporting parts by which the expanding-mandrel is actuated. A sliding wedge I is inserted between the clamps D D' when the latter are secured on the thimble $f$ and an opposing vertical flange B' of the casting B and acts on the outer face of said clamps D D' to press or force the same toward the clamping-jaw E. The mandrel H is movable endwise and attached to a sliding block J. The supporting-mandrel G' is curved on its outer face to fit the curvature of the interior of the fitting, Figs. 3 and 9, and is rigidly supported in place and held from movement under the pressure of the wedge I by being attached at one end to a bracket M⁵, which is bolted to and rises from the top surface of the plate A', and by bearing at its opposite end against a supporting-surface and the block J, herein shown as formed by a plate H', attached to the mandrel H near the block J. In placing the fitting upon the machine the same is slipped over the end of said supporting-mandrel G' at a time when the clamp-jaw B and the wedge I are retracted and the supporting-mandrel H is shifted endwise away from said mandrel G'. In placing the fitting in the machine the same is carried over the supporting-mandrel G' until the expanding-mandrel G comes opposite the thimble $f$ of the fitting. The mandrel is then inserted in the thimble by lateral movement of the fitting and the clamping-jaw E then advanced into bearing contact with the fitting. The clamping-jaws D D' (if not previously clamped on the fitting) are then closed upon the thimble or socket and the wedge I advanced, so as to crowd the said clamping-jaws toward the mandrel G' and clamping-jaw E, which latter jaw is accurately placed to hold the fitting in operative relation to the supporting-mandrel.

Referring now to the details of construction in the clamping devices referred to, which will be described before the expanding devices are explained, such details are as follows: The clamping-jaws D D', as before stated, are made separate from the other parts of the machine and are supported solely by their engagement with the socket of the fitting. Said clamping-jaws, as herein shown, consist of two metal blocks having semicircular recesses in their adjacent faces and joined by a pivot $d$. Said jaws are held in clamping relation by means of two links $d'\,d'$, which are pivoted to the lower one of the jaws and at their upper ends to a hand-lever $d^2$, having a cam-surface $d^3$, which is adapted to act upon the upper jaw D' when said hand-lever is swung upon its pivot in a manner to force the upper jaw toward the lower jaw. The sliding wedge I consists of a metal block which is provided with a U-shaped notch, forming two horizontal arms, which straddle the frame member F' at the time the wedge advances to act against the clamping-jaws. The said wedge is attached to a longitudinally-arranged guide-arm I', Figs. 2, 3, and 4, which guide-arm engages a guide groove or recess $b$, formed in the upper surface of the casting B, below the said wedge. The said guide-arm I' is held or confined in the casting B by means of a gib $b'$, which is secured to the casting by bolts or otherwise and is provided at its upper part with a laterally-projecting rib which engages a longitudinal groove $i$, formed in the inner side face of the guide-arm I'. The said wedge-block I is attached to the rear end of the guide-arm I', (referring to the direction in which the guide-arm is moved in advancing the wedge-block,) so that said guide-arm will support the wedge-block in its horizontal movement and sustain the same when in its retracted position. The flange B' is inclined on its inner face, and the outer or bearing surface of the wedge-block I is correspondingly inclined, so that as the block advances along the said inclined face of the flange it will be advanced toward the clamping-jaws D D'. The guide-bar I' is shown as inclined to correspond with the direction of movement of the said wedge-block. So far as the operation of said wedge is concerned it may be actuated by hand or in any other desirable manner, but as herein shown it is operated by means of a sliding block J, which moves endwise on the machine-frame and carries the endwise-movable supporting-mandrel H. Said block J is provided with a lateral projection J', which is horizontally apertured for the passage of an operating-rod I², attached to the rear end of the wedge-block I. The rod I² passes loosely through the projection J', so that said projection may slide freely on the rod, and the end of the rod which is attached to the wedge-block may be free to move laterally to the slight extent required by reason of the sidewise movement of said block. Said operating-rod is provided with a nut $i'$, which forms a shoulder on the rod adapted for contact with the projection J' when the block J is moved outwardly on the frame, the contact of such projection with the nut serving to draw the rod outwardly, and thus carry the wedge-block to its required position, as seen in Fig. 10. A coiled spring I³ is placed around the rod I², between the rear end of the wedge-block and the projection J', said spring serving as a means of transmitting pressure from the projection to the wedge-block when the said sliding block J is advanced to carry the mandrel H through the fitting, said spring serving to force the block forwardly with a yielding pressure, the extent of which depends on the tension of the spring. The employment of a spring for this purpose avoids liability of the wedge-block being forced against the clamping-jaws D D' with sufficient force to bend or injure the fitting, it being of course understood that the spring is made sufficiently stiff to insure the advance of the block to a position to firmly hold the said clamping-jaws from outward movement, and thus insure the retention of the fitting accurately in place with respect to the supporting-mandrel G'. The guide-flange B' is arranged to extend above the level of the frame member F' in order to give a solid bearing for the wedge-block, and said flange is provided with a notch, as shown in dotted lines in Fig. 4, to give room for the passage of said frame-bar.

Now referring to the clamping-jaws C C', by which the frame-bar is held or supported in place, said clamping-jaws are arranged to act laterally upon the frame-tube and both jaws slide horizontally toward and from the said tube. In the particular construction illustrated the said casting B is provided with a wide horizontal dovetailed groove on which the lower parts of both jaws are fitted to slide. The jaws are thrown apart or separated to permit the insertion of the frame-tube by means of a spring $c$, Fig. 12. For actuating the said jaws a vertical rock-shaft C² is mounted in the casting B and projects upwardly through a yoke-piece C³, attached to the jaw C and extending beneath the jaw C'. Said rock-shaft is provided at its end with a hand-lever C⁴, and is provided within the yoke C³ with opposite cam projections $c'$ $c^2$, of which the cam projection $c'$ acts on the outer face of the jaw C' to force the same toward the jaw C, while the cam projection C³ acts upon the yoke-piece C³ to draw the jaw C toward the jaw C'. Upon turning the rock-shaft so as to relieve the jaw C' and the yoke C³ from pressure of the said cam projections the jaws will be opened by the spring $c$, while the turning of the rock-shaft in a direction to bring the said cam projections against the said jaw C' and yoke has the effect of moving both jaws equally toward the frame-tube, and thus accurately centering the tube, while at the same time rigidly holding the same in place with respect to the socket in which its end is to be secured.

Now referring to the devices shown for moving or actuating the clamping-jaw E said clamping-jaw is provided with a laterally-projecting bearing-pin $e$, which is engaged with the slotted end of the upright arm E' of a bell-crank lever, the horizontal arm E² of which extends outwardly from the machine-frame and serves as a hand-lever for actuating the said jaw. Said bell-crank lever is mounted on a pivot-stud $e'$, attached to a depending bracket E³ on the frame-plate A'. For the purpose of holding the clamping-jaw rigidly and accurately in its advanced position or in contact with the fitting F a pivoted detent E⁴ is provided, the same having an actuating-handle $e^2$ and a partially concentric and partially eccentric cam-surface $e^3$, adapted to engage a stud $e^4$ on the side of the lever-arm E². When the said lever-arm is lifted to advance the clamping-jaw into contact with the fitting, the detent E⁴ is then swung toward the same until its cam-surface $e^3$ engages the said stud, and thereby positively holds the lever and the connected clamping-jaw from backward movement.

Now referring to the expanding-mandrel G, the supporting-mandrel G' therefor, and the actuating devices on the supporting-mandrel H, which parts coact in the operation of distending the inner frame-tube into the outer thimble or socket $f$, these parts are constructed as follows: The expanding-mandrel is constructed generally in the same manner that other expanding-mandrels have heretofore been made, the same consisting of a revolving cylindric shell $g^2$, a plurality of conical rollers K, which are inserted loosely within the shell and extend through radial slots $g$ in the outer face thereof, and a central endwise-movable rotating spindle K', the outer end of which is made conical and enters between the rollers K and which when revolved and at the same time advanced or thrust outwardly serves to rotate said rollers and at the same time force them radially outward against the tube to be expanded, the rotary motion thus given to the rollers serving to carry the same bodily upon or along the inner surface of the tube, and thereby giving a corresponding movement to the mandrel-shell, which necessarily moves or turns with them. The rotative shell $g^2$ is mounted to turn freely upon the supporting-mandrel G', the connection between said shell and supporting-mandrel, as herein shown, being formed by means of a circular groove near the inner end of the shell, which circular groove is engaged by means of annular segmental ribs formed in the ends of two longitudinal plates $G^3$ $G^3$, Figs. 6 and 7, which plates are detachably secured (conveniently by screws $g'$ $g'$) to the metal bar, which constitutes the main part or body of said supporting-mandrel. For giving rotary movement to the spindle $K'$ devices are provided as follows: Mounted upon said spindle is a gear-pinion L, through which the spindle is adapted to freely slide endwise; but it is held from turning on the spindle by means of a short spline on the pinion engaging a longitudinal groove $k$ in the said spindle. The pinion L is held from endwise movement with respect to the expanding-mandrel G preferably by being inserted between the body part $G'$ of the mandrel and a separate intermediate plate $G^4$, which is arranged longitudinally of the mandrel and inserted between the body thereof and the plates $G^3$ $G^3$, being held in place by the same screws $g'$ which secure said plates $G^3$ to the mandrel-body. The body of the mandrel being thicker than the plate $G^4$, the pinion is shown as sunk in a recess in the mandrel and as bearing against the flat inner face of said plate $G^4$. The said pinion L is given rotary motion by means of an endwise-movable rack-bar $L'$, which is mounted to slide in the mandrel $G'$ and is actuated from a crank-disk M through the medium of a connecting-rod $M'$, said crank-disk being affixed to a shaft $M^2$, which is mounted in a suitable bearing $m$ on the machine-frame and carries a driving-pulley $M^3$. The connecting-rod $M'$ is shown as engaging a stud $m'$, attached to a sliding rod $M^4$, to which the rack-bar $L'$ is directly attached at its outer end, Figs. 2 and 11, said sliding block $M^4$ being mounted to slide horizontally in guides formed in the bracket $M^5$, attached to the top of the machine-frame. Said rack-bar is shown as fitted within a guide-groove formed in the lower part of the supporting-mandrel $G'$ in position to intermesh with the pinion L, said groove being formed between the lower part of the body $G'$ of the spindle and the plate $G^4$, and the rack-bar being provided with a lateral rib $l$, which engages a longitudinal groove $g^3$, formed in the inner face of the said plate $G^4$, Figs. 5 and 9.

The endwise-movable and rotative spindle $K'$ projects at its inner end past the inner face of the supporting-mandrel $G'$ and is adapted for engagement with and given endwise movement by a sliding wedge N, which is mounted obliquely in the supporting-mandrel H and is provided with a lateral bearing-surface having contact with the said spindle. Said wedge N is actuated by means of a hand-lever O, to which the wedge is connected by means of a connecting-rod $O'$, the hand-lever being mounted on the sliding block J, which carries the said mandrel H. These parts are so constructed that when the wedge-bar N is advanced or forced forward by pressure on the hand-lever it will act upon the inner end of the spindle $K'$ to force the same outward, and thereby expand the rollers K against the tube in which it is located, said mandrel being thus advanced at the same time that it is being rotated by the rack-and-pinion gear described, so that the rollers will operate to expand or stretch the tube in which they are placed in the same manner as in the case of similarly acting expanding-mandrels.

Referring to the details of construction in the mandrel H and the wedge N, said mandrel is provided with an oblique guide-passage, and the end portion of the wedge which engages the spindle $K'$ is confined or held within the mandrel by means of a separate holding-strip $H'$, which is secured by screws $h$ $h$ to the upper wall of the said recess and engages at its rear or inner edge with an upwardly-projecting rib $n$, formed on the rear edge of the wedge.

The mandrel H is convexly curved on its outer surface and adapted to fit or bear closely against the inner surface of the fitting or hanger F, so that lateral movement of the mandrel under pressure exerted on the actuating-spindle of the expanding-mandrel through the medium of the wedge is prevented, it being of course understood that the fitting itself is firmly held from any lateral or outward movement by the clamping-jaw E. As hereinbefore stated, the said mandrel H is movable endwise, being attached to the sliding block J, and such endwise movement of the block is sufficient to enable the mandrel H to be withdrawn past the free end of the supporting-mandrel $G'$, so as to permit the tubular fitting to be easily placed or slipped over the said supporting-mandrel and the expanding-mandrel G inserted within the socket or laterally-projecting thimble on the said fitting. After the fitting has thus been placed over the supporting-mandrel $G'$ the sliding block $J'$ is then advanced, so as to carry the mandrel H into its place within the fitting, and the external clamping devices are then operated to clamp and hold the fitting, as hereinbefore described. For the purpose of giving motion to the sliding block J a hand-lever $J^2$ is shown as pivoted between its ends to the said block, so as to swing in a horizontal plane, said lever being connected with the outer end of the casting B by means of a connecting rod or link $J^3$.

The clamping-jaws D $D'$ are mainly for the purpose of confining the thimble or sockets $f$ from expansion under the action of the expanding-mandrel during the operation of the latter upon the end of the tubular part inserted within said socket, and said clamping-jaws serve only incidentally as a means of holding the fitting or hanger in place, inasmuch as they serve after being clamped upon said socket or thimble as a convenient means through which clamping pressure may be applied to the fitting by the action of a clamping device, such as the sliding wedge I. The clamping-jaw E is intended to determine accurately the position of the fitting, and for this purpose is always brought up to a definite point or position and therefore constitutes a stationary jaw or clamping member, while the wedge-block constitutes an opposing movable clamping jaw or member which acts on the fitting through the medium of the clamping-jaws D D' after the same have been clamped about the thimble or socket of the fitting. The supporting-mandrels G and H do not in themselves necessarily serve as a means for clamping or holding the fitting in place, the said mandrel being attached at one end only to the parts which support them. When held in place by the wedge-block I and jaw E, the fitting is, however, brought closely into contact with the outer surface of the supporting-mandrel G', so that said fitting is held accurately in place with respect to the expanding-mandrel carried by said supporting-mandrel. The supporting-mandrel H for the wedge-bar is mounted so as to rest in contact with the inner surface of the fitting and is held in position when the wedge-block is advanced by its contact with the inner surface of the fitting, as before stated, the backward pressure of said mandrel being, in fact, taken or carried not only by the clamping-jaw E, but by the metal of the fitting itself, the stiffness of which tends to prevent backward movement of said mandrel when the actuating-spindle is driven forward between the rollers of the expanding-mandrel.

Figs. 14, 15, 16, and 17 represent a machine which is in all respects like that hereinbefore described, with the exception that it is intended for the attachment of two tubular frame members, such as the rear forks $F^2$ $F^2$, to the rearwardly-projecting thimbles or sockets $f^2$ $f^2$ of a crank-hanger, such as is shown in the other figures of the drawings. The machine illustrated in this instance is provided with clamping-jaws D D', which are like those before described, with the exception that they are provided with double sockets, so as to engage at one time both of the thimbles $f^2$ $f^2$, said thimbles being shown in dotted lines in said Fig. 14 within the clamps. The machine shown in said Fig. 14 also differs from that before described by having a form of holding devices adapted to engage the outer ends of the frame members $F^2$ $F^2$ in such manner as to hold them rigidly in proper operative position with respect to the fitting when the latter is held in position by the clamping devices which act thereon. The attachment for so holding the outer ends of the rear-fork members is shown in said Figs. 14 to 17 as employed in place of the clamping-jaws C C'; but they may be used in connection with similar jaws. Such attachment is shown as secured to the casting B by insertion in the horizontal dovetailed groove of said casting. Said holding attachment consists of a plate Q, which engages said casting B, which is provided with two rearwardly-projecting parallel arms Q' Q', the rear ends of which are connected by means of a transverse plate $Q^2$. The said plate is downwardly and outwardly inclined, and in the upper surface of the same is formed a guide-groove of dovetailed form adapted to receive a sliding plate P. To the top surface of said plate is secured an apertured holding-bar P', having four transverse openings $p$ $p$, which are made of such size and so located as to receive the lower portions or prongs of the slotted rear-fork connecting-plates. The sliding plate P, together with the holding-bar, is provided with means by which it may be removed or shifted laterally upon the plate $Q^2$, the same consisting of a horizontal rock-shaft $Q^3$, mounted in a bearing $q$, which depends from the plate $Q^2$, and provided with a hand-lever $Q^4$, outside of said bearing, and with an actuating-arm $Q^5$, the free end of which is connected with the inner edge of the stop P by means of a connecting-link $q'$. For the purpose of holding the said plate P in the position to which it is moved or shifted a set-screw $P^2$ is inserted through the side of the plate $Q^2$ and bears against the side edge of the said plate P. In the particular construction illustrated the apertured holding-bar P' is built or made up of two L-shaped bars $p'$ $p'$, secured to the top surface of the plate P, and separate filling-blocks $p^2$ $p^2$, which are secured to the L-shaped bars and to said plate P by screws or bolts; but this construction is merely incidental to the special machine shown and is not essential.

It is to be understood that in the operation of the machine like that shown in Figs. 14 to 17 the mandrel-support G' will be provided with an expanding-mandrel which operates successively upon the two frame members, the fitting F and the frame-bars $F^2$ $F^2$ being moved laterally, after one frame member is attached, into position for the action of the expanding-mandrel on the other frame member. A construction embracing two mandrels may of course be used, in which case the fitting F and the bars $F^2$ will not need to be moved laterally to bring the said bars into proper position with respect to the expanding-mandrels. Such movement of the frame members and fitting is provided for in the construction shown by making the supporting-bar P' with the two sets of openings $p$ $p$, located at such distance apart that either set may be engaged with the outer ends of the rear forks.

In the putting together of a bicycle-frame it will of course be understood that a machine like that shown in Figs. 1 to 13 may be used to secure to the hanger a seat-post member such as is shown at $F^3$ in Fig. 15, it being only necessary that the clamping devices be so shaped as to receive the hanger when in the position necessary for the insertion of said seat-post member into the thimble or socket $f'$ of said hanger. Obviously, therefore, a machine embracing the features of construction illustrated and described may be employed to secure all four of the frame members of a bicycle to the hanger thereof.

One of the main features of my invention is embraced in the construction described, wherein an expanding-mandrel is mounted on a supporting-mandrel so as to project at right angles therefrom, and the said expanding-mandrel is driven by gearing mounted upon the supporting-mandrel, so that the expanding-mandrel may be inserted in its operative position by first placing the tubular fitting over the supporting-mandrel and then moving said fitting sidewise until the expanding-mandrel is brought into the thimble of the fitting, and inasmuch as the expanding-mandrel may be driven by gearing other than the rack-and-pinion gear described I do not wish to be limited to the use of such special form of gear, except so far as the same is specifically claimed as part of my invention.

Another principal feature of the invention is embraced in the construction by which the driving-spindle of the expanding-mandrel is given endwise movement by actuating means mounted in a mandrel which is adapted for insertion within the fitting at one side of the supporting-mandrel by which the expanding device is sustained, and so far as this main feature of the invention is concerned I do not wish to be limited to the precise devices shown for giving rotative movement to the spindle or for giving endwise movement to the spindle. The employment for the latter purpose of a sliding wedge mounted on a second or auxiliary supporting-mandrel is, however, an important part of my invention and is herein separately claimed, as are other features illustrated which are in themselves novel.

I claim as my invention—

1. The combination with a supporting-mandrel, of an expanding-mandrel mounted upon the supporting-mandrel and projecting laterally therefrom and gearing carried by the supporting-mandrel for actuating said expanding-mandrel.

2. The combination with a supporting-mandrel, of an expanding-mandrel having a rotative spindle, and means for actuating the latter embracing an endwise-reciprocating member mounted in said supporting-mandrel and means for transmitting rotative motion to said spindle from the said reciprocating member.

3. The combination with a supporting-mandrel, of an expanding-mandrel provided with a rotative actuating-spindle and means for driving the said spindle comprising an endwise-movable rack-bar on the supporting-mandrel and a pinion actuated by said rack-bar.

4. The combination, with a supporting-mandrel, of an expanding-mandrel mounted upon and projecting laterally from said supporting-mandrel, said expanding-mandrel being provided with a rotative actuating-spindle, and means for actuating said spindle embracing a pinion on the spindle, an endwise-sliding rack-bar mounted on the supporting-mandrel, a power-driven crank-shaft, and a connecting-rod for driving the rack-bar from the crank-shaft.

5. The combination with a supporting-mandrel, of an expanding-mandrel consisting of a rotative shell mounted on the said supporting-mandrel, conical rollers mounted in said shell, an endwise-movable actuating-spindle having a conical part engaging said rollers and gearing for driving said spindle comprising an endwise-movable member mounted on the supporting-mandrel and gearing connecting said endwise-movable member with said spindle.

6. The combination with a supporting-mandrel, of an expanding-mandrel consisting of a rotative shell mounted on the said supporting-mandrel, conical rollers mounted in said shell, an endwise-movable actuating-spindle having a conical part engaging said rollers and gearing for driving said spindle comprising an endwise-movable rack-bar mounted on the supporting-mandrel and a pinion intermeshing therewith.

7. The combination with a supporting-mandrel, an expanding-mandrel mounted thereon and projecting laterally therefrom, a second supporting-mandrel mounted parallel with the first-mentioned supporting-mandrel and means on said second mandrel for giving endwise movement to the said actuating-spindle.

8. The combination with a supporting-mandrel, of an expanding-mandrel mounted thereon and projecting laterally therefrom, said expanding-mandrel being provided with an endwise-movable actuating-spindle, a second supporting-mandrel arranged parallel with the first-mentioned supporting-mandrel and a sliding wedge mounted on the said second supporting-mandrel and acting on said spindle to give endwise movement thereto.

9. The combination with a supporting-mandrel, of an expanding-mandrel projecting laterally therefrom and provided with a rotative and endwise-movable actuating-spindle, an endwise-sliding rack-bar on the supporting-mandrel, a pinion on the actuating-spindle engaging said rack-bar, a second supporting-mandrel arranged parallel with the one first mentioned and a sliding wedge on said second supporting-mandrel acting on said spindle to give endwise movement thereto.

10. The combination of a supporting-mandrel, an expanding-mandrel mounted thereon and projecting laterally therefrom, said expanding-mandrel embracing an endwise-movable actuating-spindle, a second supporting-mandrel arranged parallel with the one first mentioned and means on said second expanding-mandrel for giving endwise movement to said spindle, one of said mandrels being movable endwise with respect to the other one to permit the insertion of both mandrels into a tubular fitting from opposite sides thereof.

11. The combination with a supporting-mandrel, of an expanding-mandrel which is mounted upon and projects laterally from said supporting-mandrel, a second supporting-mandrel, means carried by said second supporting-mandrel for actuating one of the parts of the expanding-mandrel, a sliding block on which said second supporting-mandrel is mounted, and a hand-lever connected with said sliding block for actuating the latter.

12. The combination with a supporting-mandrel, of an expanding-mandrel which projects laterally therefrom, and means for supporting a fitting in operative position with respect to said expanding-mandrel, comprising a main clamping-jaw which is movable laterally toward and from the supporting-mandrel, laterally-movable clamping-jaws adapted to engage a thimble on the fitting and clamping means acting on said clamping-jaws to force the latter and the fitting toward said main clamping-jaws.

13. The combination with a supporting-mandrel, of an expanding-mandrel, which projects laterally therefrom, and means for supporting a fitting in operative position with respect to said expanding-mandrel comprising a main clamping-jaw which is movable laterally toward and from the supporting-mandrel, laterally-movable clamping-jaws adapted to engage a thimble on the fitting and clamping means acting on said clamping-jaws to force the latter and the fitting toward said main clamping-jaw comprising a sliding wedge.

14. The combination with a supporting-mandrel and an expanding-mandrel mounted thereon and projecting laterally therefrom, of clamping means adapted to act upon a tubular fitting to hold the same in operative position with respect to the said expanding-mandrel and separate holding means constructed to engage a tubular member to hold the same in position with respect to said expanding-mandrel and tubular fitting.

15. The combination with a supporting-mandrel, of an expanding-mandrel mounted thereon and projecting laterally therefrom, clamping means consisting of clamping-jaws which are movable toward and from the supporting-mandrel and adapted to engage a tubular fitting which surrounds said supporting-mandrel and separate holding means consisting of movable parts which are adapted to be moved into position to engage and hold the tubular part after the latter has been placed in position for the action thereon of the expanding-mandrel.

16. The combination with a supporting-mandrel, of an expanding-mandrel mounted thereon and projecting laterally therefrom, a clamping-jaw which is movable laterally toward and from the supporting-mandrel, means for actuating said clamping-jaw embracing a detent by which the same is held at a definite point and clamping means acting in opposition to said clamping-jaw and operating to hold the fitting adjacent to that side of the supporting-mandrel on which the expanding-mandrel is located.

17. The combination with a supporting-mandrel, of an expanding-mandrel mounted thereon and projecting laterally therefrom, a clamping-jaw which is movable laterally toward and from the supporting-mandrel, means for actuating said clamping-jaw embracing a detent by which the same is held at a definite point and clamping means acting in opposition to said clamping-jaw and operating to hold the fitting adjacent to that side of the supporting-mandrel on which the expanding-mandrel is located, such clamping means embracing laterally-movable clamping-jaws which embrace the thimble or socket in which the expanding-mandrel is inserted and a sliding wedge acting on said clamping-jaws.

18. The combination with a supporting-mandrel, of an expanding-mandrel mounted on and projecting laterally from said supporting-mandrel, said expanding-mandrel embracing a longitudinally-movable actuating-spindle, a second supporting-mandrel arranged parallel with the one first mentioned and provided with actuating means which operate on said spindle to give endwise movement to the same, a movable block sustaining said second supporting-mandrel, clamping means for holding the fitting in position with respect to the said mandrels comprising a sliding wedge-block and operative connections between said wedge-block and the movable block for actuating the wedge-block in the endwise movement of said sliding block.

19. The combination with a supporting-mandrel, of an expanding-mandrel, clamping means comprising clamping-jaws which engage the socket or thimble within which the expanding-mandrel is inserted, a sliding wedge-block acting upon said clamping-jaws to force the fitting toward the supporting-mandrel and means for actuating said wedge-block embracing a spring through which pressure is applied to said block to advance the same into its clamping position.

20. The combination, with a supporting-mandrel, of an expanding-mandrel mounted thereon and projecting laterally therefrom, clamping means embracing clamping-jaws which engage the socket or thimble within which the expanding-mandrel is inserted, a sliding wedge-block acting on said clamping-jaws, a second supporting-mandrel, means on said second supporting-mandrel for operating a movable part of the expanding-mandrel, a movable block sustaining said second supporting-mandrel, a rod attached to said wedge-block and having sliding engagement with said movable block, and a spring located between the said sliding block and the wedge-block, through which pressure is applied to the latter for advancing the same to its clamping position.

21. The combination with a supporting-mandrel, of an expanding-mandrel mounted on said supporting-mandrel and projecting laterally therefrom, means for holding the fitting in contact with the supporting-mandrel comprising a sliding wedge-block, and an endwise-movable guide-arm to which said block is attached and which slides in a guide-groove on the machine-frame.

22. The combination with a supporting-mandrel, of an expanding-mandrel mounted upon and projecting laterally from the supporting-mandrel and clamping means for holding the fitting in position with respect to the expanding-mandrel comprising two clamping-jaws adapted to engage the outer surface of the socket or thimble in which the expanding-mandrel is inserted and a sliding wedge-block which is bifurcated so as to pass on opposite sides of the tube which is inserted in said thimble or socket and to bear upon said clamping-jaws at both sides of the said thimble.

23. The combination with a supporting-mandrel, of an expanding-mandrel mounted on said supporting-mandrel and projecting laterally therefrom, said expanding-mandrel embracing an endwise-movable actuating-spindle, a second supporting-mandrel parallel with the one first referred to, a sliding block on which said second mandrel is mounted, a sliding wedge mounted in said second mandrel and acting on said actuating-spindle to give endwise movement to the same and a hand-lever mounted on said sliding block and connected with said sliding wedge to give endwise movement to the latter.

24. The combination with a supporting-mandrel, of an expanding-mandrel mounted upon and projecting laterally from said supporting-mandrel and clamping means for holding a tubular part in position for the action of the expanding-mandrel thereon, said clamping means consisting of two sliding jaws one of which is provided with a yoke-piece which extends past the opposite jaw and a rock-shaft provided with cam projections acting on said yoke-piece and said opposite jaw to force the jaws together.

25. The combination with a supporting-mandrel, of an expanding-mandrel mounted on and projecting laterally from said supporting-mandrel, clamping means for supporting a tubular fitting in operative position with respect to said expanding-mandrel and holding means adapted for engagement with two tubular frame members to hold the same in position with respect to the expanding-mandrel, and the thimbles of the fitting into which the ends of said tubular frame members are to be expanded; said holding means embracing two sets of holding recesses or sockets with either set of which the outer ends of the frame members may be engaged.

26. The combination with a supporting-mandrel, of an expanding-mandrel mounted on and projecting laterally from said supporting-mandrel, clamping means for supporting a tubular fitting in operative position with respect to said expanding-mandrels and holding means adapted for engagement with two tubular frame members to hold the same in position with respect to the expanding-mandrel and the thimbles of the fitting into which the ends of said tubular frame members are to be expanded, said holding means embracing a laterally-movable bar provided with two sets of holding-recesses for engagement with the said tubular frame members and means for holding said bar from movement when engaged with said frame members.

In testimony that I claim the foregoing as my invention I affix my signature, in presence of two witnesses, this 15th day of December, A. D. 1897.

JOSEPH NATHANIEL HALIFAX.

Witnesses:
C. CLARENCE POOLE,
EDMUND A. STRAUSE.